2,809,942

PROCESS FOR MAKING POLYGLYCIDYL CYANURATES

Harold G. Cooke, Jr., Louisville, Ky., assignor to Devoe & Raynolds Company, Inc., Louisville, Ky., a corporation of New York No Drawing. Application October 21, 1955, Serial No. 542,103

6 Claims. (Cl. 260—2)

This invention relates to the manufacture of epoxide resins which are polyglycidyl derivatives of cyanuric acid, and which are useful in the coatings, molding, adhesive, and other fields.

The present invention is based on the discovery that polyglycidyl cyanurates can advantageously be prepared by a two-step process, in which cyanuric acid is first reacted with epichlorhydrin in the presence of a catalyst to form polychlorhydrin cyanurates, which are then subjected to dehydrohalogenation to form the polyglycidyl cyanurates.

Cyanuric acid is a symmetrical six-member ring compound having alternating carbon and nitrogen atoms, and having the empirical formula $C_3N_3O_3H_3$. It can exist in two tautomeric forms, and two formulas have been assigned to these two forms. In one formula cyanuric acid is a symmetrical trihydric triazine with three hydroxyl groups on the three carbon atoms. In the other formula, cyanuric acid is considered as made up of alternating CO and NH groups. In the first of these formulas, cyanuric acid is a trilactim, and in the second, a trilactam. It is known that cyanuric acid can be changed from one tautomeric form to another and may react in one form or the other to form, e. g., both O-esters and N-esters; and that even the derivatives of cyanuric acid may, in certain cases, change from one form to another by re-arrangement, e. g., from O-esters into N-esters. Because of this tautomerism, I use the terms "polychlorhydrin cyanurates" and "polyglycidyl cyanurates" for the esters resulting from the reaction of cyanuric acid with epichlorhydrin and the glycidyl esters resulting from dehydrohalogenation, whether the esters are O-esters or N-esters or mixtures of both.

In the first step of the process, cyanuric acid is reacted with epichlorhydrin in the presence of an organic solvent and a catalyst, and advantageously a tertiary amine or quaternary ammonium catalyst, to form polychlorhydrin cyanurates.

Cyanuric acid has only limited solubility in most organic solvents. When it is admixed with epichlorhydrin and an organic solvent, which may be an excess of epichlorhydrin, the finely divided cyanuric acid in suspension gradually and progressively dissolves and reacts to form the polychlorhydrin cyanurate which is soluble in the solvent.

The proportions of reagent used in the first step of the process are advantageously 3 mols or more of epichlorhydrin to 1 mol of cyanuric acid. The reacting proportions appear to be limited to 3 mols of epichlorhydrin to 1 of cyanuric acid. With proportions of less than 3 mols of epichlorhydrin to 1 mol of cyanuric acid, only that portion of the cyanuric acid which represents a 3 to 1 molar ratio of epichlorhydrin to cyanuric acid appears to enter the reaction. Any excess unreacted cyanuric acid can be removed by filtration from the solution of the chlorhydrin derivative formed; or, if not removed, the unreacted cyanuric acid may react with the glycidyl cyanurate during the subsequent dehydrogenation step of the process to form higher molecular weight products.

With lower ratios of epichlorhydrin to cyanuric acid of around 3 to 1, an inert organic solvent such as dioxane is advantageously used. It is more advantageous, however, to use a considerable excess of epichlorhydrin as the solvent, and the use of such an excess, e. g., 15 mols of epichlorhydrin to 1 of cyanuric acid, gives products which are largely monomeric in character.

The reaction is carried out by heating the reaction mixture at reflux temperature over a period of time varying from about one-half hour to about six hours, depending upon the proportions of the reactants.

The catalysts which have been found advantageous for use in this reaction include tertiary amines such as tripropyl amine and dimethyl aniline; quaternary ammonium hydroxides, such as benzyl trimethyl ammonium hydroxide; quaternary ammonium salts, such as benzyl trimethyl ammonium chloride; and quaternary ammonium ion-exchange resins.

Some dehydrohalogenation may take place during this first step of the process to form epoxy groups that react with other cyanuric acid groups, with the resulting formation of polymeric products, in which the cyanuric acid residues or nuclei are joined together through

—$CH_2$—$CHOH$—$CH_2$— groups. Thus, a monomeric polychlorhydrin, such as the trichlorhydrin cyanurate, would have three chlorhydrin groups, —$CH_2$—$CHOH$—$CH_2Cl$, joined to a single cyanuric acid residue; while a dimeric product, resulting from the reaction of 5 mols of epichlorhydrin with 2 of cyanuric acid and with dehydrohalogenation of one chlorhydrin group, would have 4 chlorhydrin groups, 2 secured to each of the 2 cyanuric acid residues, and with the residues separated by the —$CH_2$—$CHOH$—$CH_2$— group.

With lower proportions of epichlorhydrin to cyanuric acid, and with the use of an inert organic solvent, polymerization tends to take place to a somewhat greater extent than when a large excess of epichlorhydrin is used as the solvent. When the proportions are less than 3 mols of epichlorhydrin to 1 or cyanuric acid, e. g., 2½ mols to 1, the unreacted cyanuric acid will remain in suspension in a finely divided form in the reaction product and can be filtered therefrom; or any unreacted cyanuric acid can be left in the product so that during dehydrohalogenation it can react with the glycidyl cyanurate formed to form a higher melting point polymeric product. The use of a large excess of epichlorhydrin, e. g., 15 mols of epichlorhydrin to 1 of cyanuric acid, is advantageous in giving products which are largely monomeric trichlorhydrin cyanurate, with a limited amount of polymerization.

The second step of the process is the dehydrohalogenation of the polychlorhydrin cyanurates. This dehydrohalogenation of the polychlorhydrin esters is effected with the use of basic reagents, and advantageously with the use of either anhydrous sodium hydroxide or an aqueous solution of sodium hydroxide. Other basic reagents such as potassium hydroxide, calcium hydroxide, sodium carbonate, etc., can also be used in this step. The reaction of dehydrohalogenation is slightly exothermic, but can be controlled and kept below 100° C. by cooling means such as indirect cooling by water. Water present in the reaction mixture is removed during or immediately following the dehydrohalogenation, by distillation of a part of the solvent. Byproduct salt and unreacted alkali are removed by filtration, and the product is isolated by removal of the solvent by vacuum distillation.

The polyglycidyl cyanurates thus obtained are viscous liquids or low melting point solids varying somewhat in their epoxide equivalents, depending upon the extent to which varying amounts of polymeric products may be present in admixture with the monomeric products. The epoxide equivalents may thus range from around 120 or less up to around 331 or somewhat more.

The epoxide equivalent is the equivalent weight of the product per epoxide group. The method used for determining the epoxide content comprises heating 1 gram sample of the product with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1 HCl is equivalent to 1 epoxide group.

The polyglycidyl cyanurates are only partially soluble in acetone, but are easily soluble in acetone containing a small amount of water. Dioxane is a good solvent for these products, especially if the dioxane contains a few percent of water.

The epoxide resins thus produced, and which are polyglycidyl cyanurates largely in a monomeric form, but which may be polymerized to a greater or less extent, have the advantage as epoxide resins in that they are polyfunctional and contain more than 2 epoxide groups per molecule, e. g., 3 in the monomeric products and 4 or more in the polymeric products. And the polymeric products contain intermediate alcoholic hydroxyl groups.

Because of their polyfunctional reactive properties due to the number of reactive epoxide groups, these products are advantageously used for reaction with other compounds containing active hydrogen, to form higher molecular weight or cross-linked compounds including infusible and insoluble reaction products.

Epoxide resins produced by the two-step process may contain varying amounts of chlorine, depending upon the extent to which the dehydrohalogenation is carried. The chlorine content of products produced by a single dehydrohalogenation treatment can be reduced by one or more subsequent treatments to give products of lower chlorine content and somewhat lower epoxide equivalent.

Higher melting point epoxide resins are advantageously produced by reacting the polyglycidyl cyanurates produced as above described with further small amounts of cyanuric acid. By limiting the amount of added cyanuric acid used and reacted, e. g., so that the active hydrogens on the cyanuric acid are not more than half that equivalent to the epoxide groups of the polyglycidyl cyanurates, higher melting point epoxide resins can be produced. So also, by using larger proportions of cyanuric acid, insoluble and infusible reaction products can be obtained.

The invention will be further illustrated by the following specific examples, but it will be understood that the invention is not limited thereto. In the examples, the parts are by weight. The apparatus used in carrying out the process of the examples was a three-necked, round-bottom flask equipped with thermometer, agitator, and reflux condenser.

*Example 1.*—A mixture of 129 parts (1 mol) of cyanuric acid, 277.5 parts (3 mols) of epichlorhydrin, 258 parts of dioxane and 11.5 parts of a 35% solution of benzyl trimethylammonium hydroxide in methyl alcohol was heated with agitation to 88° C. At this temperature, a slightly exothermic reaction set in and the temperature was allowed to rise to a refluxing temperature of 100° C., and refluxing was continued for 3 hours and 25 minutes.

The reaction mixture was then cooled to 29° C. and the addition of the sodium hydroxide began. The sodium hydroxide was added in six portions of 20 parts each over a period of 1 hour and 19 minutes, and the reaction temperature was held below 90° C. with a cold water bath. The reaction temperature was held at 84–87° C. for 1 hour after the last addition of sodium hydroxide, and the reaction mixture was then cooled and filtered. The filter cake was washed with dioxane.

The solvent was removed from the product by vacuum distillation, leaving a product having an epoxide equivalent of 208 and a melting point of 64° C., and a chlorine content of 6.7%.

*Example 2.*—A mixture of 129 parts (1 mol) of cyanuric acid, 925 parts (10 mols) of epichlorohydrin, and 11.5 parts of a 35% solution of benzyl trimethylammonium hydroxide was heated with agitation to 86° C. At this temperature, the reaction became exothermic and the temperature rose to a reflux temperature of 110°–112° C., and refluxing was continued for ¾ hour.

The mixture was then cooled to 36° C. and 41 parts sodium hydroxide added. The temperature was raised slowly and two additional 41 part portions of sodium hydroxide added over a period of 1½ hours. The mixture was held at refluxing for 20 minutes, cooled and filtered to remove salt and unreacted alkali.

The filter cake was washed with epichlorohydrin and the solvent removed from the product solution by vacuum distillation leaving a product having an epoxide equivalent of 145, a melting point of 62° C., a chlorine content of 5.5%, and with a yield of about 97%.

*Example 3.*—A mixture of 129 parts (1 mol) of cyanuric acid, 1387.5 parts (15 mols) of epichlorohydrin and 11.5 parts of a 35% solution of benzyl trimethylammonium hydroxide were heated with agitation to 104° C., when the mixture began to reflux and the mixture was held at reflux for ½ hour.

The mixture was then cooled to 75° C. and 123 parts sodium hydroxide added. The reaction mixture was held at reflux temperature for ½ hour, cooled and filtered, and the filter cake was washed with two 100 part portions of epichlorohydrin.

The solvent was removed by vacuum distillation leaving a product having an epoxide equivalent of 135, and with a yield of about 100%.

*Example 4.*—A mixture of 129 parts (1 mol) of cyanuric acid, 1388 parts (15 mols) of epichlorohydrin, and 4 parts dimethyl aniline were heated to reflux temperature and held at reflux for 3 hours.

The mixture was cooled, 123 parts sodium hydroxide added, and the mixture held to a temperature below 90° C. for 10 minutes. Part of the excess epichlorohydrin was removed by distillation. 300 parts benzene were added to the mixture. The solution was filtered and the filter cake washed with a mixture of benzene and acetone.

The remainder of the solvent was then removed by vacuum distillation, and a product was obtained having an epoxide equivalent of 142, a melting point of 58° C., a chlorine content of 4.1 and a yield of about 92%.

*Example 5.*—A mixture of 129 parts (1 mol) of cyanuric acid, 1388 parts (15 mols) of epichlorohydrin and 4 parts of tripropylamine was heated at refluxing for 2¼ hours.

The mixture was cooled and 123 parts sodium hydroxide added. The mixture was heated with slow distillation of epichlorohydrin for 1 hour, cooled, 500 parts benzene and acetone solution added and the product solution filtered. The filter cake was washed with a mixture of acetone and benzene.

The remaining solvent was removed by vacuum distillation, leaving a product having an epoxide equivalent of 152, a melting point of 61° C., a chlorine content of 4.1% and with a yield of about 99%.

*Example 6.*—A mixture of 129 parts (1 mol) of cyanuric acid, 1388 parts (15 mols) of epichlorohydrin and 11.5 parts of a 35% solution of benzyl trimethylammonium hydroxide was heated at reflux temperature for 2 hours.

The mixture was cooled to 75° C. and 123 parts sodium hydroxide added. The reaction mixture was held below 100° C. by indirect cooling with cold water. After 5 minutes, heat was applied and part of the excess epichlorohydrin removed by vacuum distillation. About 500 parts benzene was added and the solution filtered. The filter cake was washed with a mixture of benzene and acetone.

The solvent was removed by vacuum distillation, leaving a product having an epoxide equivalent of 145, a melting point of 55° C., a chlorine content of 4.6% and with a yield of about 98%.

*Example 7.*—A mixture of 129 parts (1 mol) of cyanuric acid, 1388 parts (15 mols) of epichlorohydrin and 7 parts of a 60% aqueous solution of benzyl trimethylammonium chloride was heated at reflux temperature for 1½ hours.

The mixture was cooled to 72° C. and 125 parts flake sodium hydroxide added. The reaction mixture was heated to 119° C. over a period of ½ hour, cooled, filtered, and the filter cake washed with epichlorohydrin.

The solvent was removed by vacuum distillation, leaving a product having an epoxide equivalent of 139, a melting point of 55° C., a chlorine content of 4.7% and with about 100% yield.

*Example 8.*—A mixture of 129 parts (1 mol) of cyanuric acid, 1388 parts (15 mols) of epichlorohydrin and 0.7 part of a 60% aqueous solution of benzyl trimethylammonium chloride was heated at reflux temperature for 1 hour. 3 parts benzyltrimethylammonium chloride solution were added and the mixture refluxed for 1 hour additional.

The mixture was cooled and 126 parts of sodium hydroxide dissolved in 126 parts of water added over a period of 15 minutes and at a temperature below 95° C. The mixture was heated with distillation of a water and epichlorohydrin mixture for ½ hour, cooled and filtered. The filter cake was washed with epichlorohydrin.

The excess epichlorohydrin was removed by vacuum distillation, leaving a product having an epoxide equivalent of 149, a melting point of 53° C., a chlorine content of 4.9% and a yield of about 100%.

*Example 9.*—A mixture of 64.5 parts (0.5 mol) of cyanuric acid, 139.0 parts (1.5 mols) of epichlorohydrin, 203.5 parts dioxane (distilled) and 3.5 parts of a 60% aqueous solution of benzyltrimethylammonium chloride was heated at reflux temperature for 4¾ hours.

The mixture was cooled to 45° C., 62 parts sodium hydroxide added, and heat was applied and the mixture was maintained at a reflux temperature of 92° C. for ¼ hour. The mixture was filtered and the filter cake washed twice with dioxane.

The solvent was removed by vacuum distillation, leaving a product having an epoxide equivalent of 196, a melting point of 53° C., a chlorine content of 6.0%, and a yield of about 66%.

In this example, a considerable amount of polymeric product was formed which was insoluble in the solvent used and which was removed in the filter cake with the salt. When freed from salt, the resulting resin melted when heated to about 200° C. and was then converted to an infusible resin.

*Example 10.*—A mixture of 129 parts (1 mol) of cyanuric acid, 231 parts (2.5 mols) of epichlorohydrin, 360 parts dioxane and 6 parts of a 60% aqueous solution of benzyltrimethylammonium chloride was heated at reflux temperature for 6 hours. At this time, the reaction mixture still contained some unreacted cyanuric acid.

The mixture was cooled, 20 parts sodium hydroxide added, and the mixture was refluxed at 101°–104° C. for 3 hours. 82 parts sodium hydroxide were added, and the reaction temperature held below 90° C. for ½ hour.

The solution was filtered and the solvent was removed from the resin with vacuum distillation, leaving a product having an epoxide equivalent of 331, a melting point of 70° C., a chlorine content of 9.9%, and a yield of about 67%.

In the process of this example, also, higher melting point resin was formed, insoluble in the solvent used and filtered off with the salt from the solution of soluble resin.

*Example 11.*—A mixture of 129 parts (1 mol) of cyanuric acid, 1388 parts (15 mols) of epichlorohydrin, and 222 parts of a quaternary ammonium chloride ion exchange resin (Rohm & Hass' IRA–400) was heated at reflux temperature for 5 hours.

The mixture was cooled, filtered and the filter cake washed with epichlorohydrin. The reaction solution was placed in a vessel and a solution of 123 parts sodium hydroxide and 154 parts water added over a period of 17 minutes. The mixture was heated with distillation of a water and epichlorohydrin mixture at 95°–100° C. for ½ hour, cooled and filtered. The filter cake was washed with 100 parts epichlorohydrin.

The excess solvent was removed with vacuum distillation, leaving a product having an epoxide equivalent of 129, a melting point of 44° C., a chlorine content of 7.8% and a yield of about 99%.

The use of an ion exchange resin as a catalyst for the first step in this process has the advantage of making it possible to prepare a more stable product. In this example, the catalyst has been removed from the product. In other examples using quaternary ammonium compounds as a catalyst, the final product contains the catalyst.

The chlorine content of the products produced by the second step of the process of the above examples can be further reduced by one or more subsequent treatments of the product with sodium hydroxide, after the excess epichlorohydrin has been removed. This is illustrated by the following examples:

*Example 12.*—A mixture of 129 parts (1 mol) of cyanuric acid, 1388 parts (15 mols) of epichlorohydrin and 7 parts of a 60% aqueous solution of benzyl trimethylammoium chloride was heated at 105 to 110° C. for 2¾ hours.

The mixture was cooled to 61° C. and 123 parts of flake sodium hydroxide was added. The reaction mixture was heated to 110° C. over a period of 25 minutes, and the remaining epichlorohydrin was removed by vacuum distillation to a maximum pot temperature of 98° C. The reaction mixture was cooled, 500 parts of methyl ethyl ketone was added and the insoluble salt was removed by filtration.

The solvent was removed from 100 parts of this solution by vacuum distillation to give 32 parts of a product having a melting point of 39° C., a chlorine content of 4.9% and an epoxide equivalent of 140. The rest of the solution was returned to the reaction vessel, 15 parts of flake sodium hydroxide was added and the temperature was raised to 80° C. After 35 minutes at 80° C. the mixture was again filtered to remove insoluble solids and the solvent was removed by vacuum distillation.

The product had a melting point of 36° C., a chlorine content of 2.9% and an epoxide equivalent of 126.

*Example 13.*—A mixture of 129 parts (1 mol) of cyanuric acid, 1388 parts (15 mols) of epichlorohydrin and 7 parts of a 60% aqueous solution of benzyl trimethylammonium chloride was heated at 105–110° C. for 2.9 hours.

The mixture was cooled to 38° C. and 123 parts of the flake sodium hydroxide was added. Over a period of 7 minutes the temperature was raised to 63° C. At this time the excess epichlorohydrin was removed by vacuum distillation to a maximum pot temperature of 98° C. The reaction mixture was cooled, 500 parts of acetone were added and the insoluble salt was removed by filtration.

The solution was returned to the reaction vessel and 20 parts of flake sodium hydroxide were added. The temperature was raised to 56° C. and held at 56 to 60° C. with slow distillation for 1½ hours. The insoluble salt was removed by filtration and the solvent was removed by vacuum distillation.

The product, 274 parts, had a melting point of 36° C., a chlorine content of 2.1% and an epoxide equivalent of 130.

*Example 14.*—A mixture of 129 parts (1 mol) of cyanuric acid, 1388 parts (15 mols) of epichlorohydrin and 7 parts of a 60% aqueous solution of benzyl trimethylammonium chloride was heated at 105–110° C. for 2½ hours.

The mixture was cooled to 40° C. and 123 parts of flake sodium hydroxide were added. Over a period of 11 minutes the temperature was raised to 79° C. At this time the excess epichlorohydrin was removed by vacuum distillation to a maximum pot temperature of 96° C. The reaction mixture was cooled, 750 parts of methyl ethyl ketone were added and the insoluble salt was removed by filtration.

The solvent was removed from 100 parts of the solution to give 28 parts of a viscous resinous product having an epoxide equivalent of 147.2 and a chlorine content of 4.89%.

The rest of the solution was returned to the reaction vessel, 20 parts of flake sodium hydroxide was added and the temperature was raised to 81° C. After 30 minutes at 81° C., the mixture was cooled and filtered to remove insoluble salt.

The solvent was removed from 100 parts of the solution to give 29 parts of a viscous resinous product having an epoxide equivalent of 139 and a chlorine content of 2.57%.

The rest of the solution was likewise treated with 10 parts of flake sodium hydroxide.

After filtration, the solvent was removed from 100 parts of the solution to give 30 g. of a product having an epoxide equivalent of 121 and a chlorine content of 1.54%.

The remainder of the solution was treated with 10 parts of flake sodium hydroxide at 80° C. for 30 minutes. After removing the salt by filtration, the solvent was removed from the solution to give 129 parts of a product having an epoxide equivalent of 120 and a chlorine content of 0.68%.

The low melting point epoxide resins produced as above described can be converted into higher melting point resins by further reaction with cyanuric acid, as illustrated by the following example:

*Example 15.*—116 parts of the epoxide resin of Example 11 and 11.6 parts of cyanuric acid were heated gradually to 145° C. over a period of 1½ hours. At this time, the reaction mixture, which was extremely viscous, was cooled, a mixture of 125 parts dioxane and 10 parts water added, and the solution filtered. 5.1 parts of unreacted cyanuric acid were recovered. The solution had a viscosity of D and a color of 4 at 48.1% solids. The product had an epoxide equivalent of 304, based on solids.

In such further reaction of the low melting point epoxide resins with cyanuric acid, the cyanuric acid appears to react as a trifunctional reactant through the active hydrogen (whether present as OH or NH groups). And the epoxide resin itself is also polyfunctional through its epoxide groups. The reaction of highly functional materials with each other leads to cross linked polymers very rapidly. Therefore, only a relatively small amount of cyanuric acid can be reacted with triglycidyl cyanurate without obtaining insoluble, infusible products.

I claim:

1. The method of producing polyglycidyl cyanurates which comprises reacting cyanuric acid with epichlorhydrin in the presence of an organic base as a catalyst and an organic solvent for cyanuric acid and with the proportion of epichlorhydrin not less than about 2½ mols of epichlorhydrin for 1 mol of cyanuric acid and sufficient to form polychlorhydrin cyanurates, and subjecting the resulting chlorhydrins to dehydrohalogenation to form polyglycidyl cyanurates.

2. The process according to claim 1, in which the catalyst is selected from the group which consists of tertiary amines and quaternary ammonium compounds.

3. The process according to claim 1 in which a large excess of epichlorhydrin is used as the organic solvent in the first step of the process.

4. The process according to claim 1 in which the dehydrohalogenation is effected by treatment with caustic alkali.

5. The process according to claim 1 in which the product produced by the second step of the process is subsequently treated with alkali to reduce the chlorine content thereof.

6. The method of producing higher melting point epoxide resins from low melting polyglycidyl cyanurates, which comprises reacting a mixture of cyanuric acid and polyglycidyl cyanurates in proportions such that the active hydrogens of the cyanuric acid are less than the epoxide groups of the polyglycidyl cyanurates.

References Cited in the file of this patent
UNITED STATES PATENTS

| | | |
|---|---|---|
| 2,581,464 | Zech | Jan. 8, 1952 |
| 2,741,607 | Bradley et al. | Apr. 10, 1956 |